(12) United States Patent
Castorino

(10) Patent No.: US 7,665,948 B2
(45) Date of Patent: Feb. 23, 2010

(54) ANTI-INJURY PROTECTION DEVICE FOR HYDRAULIC LOADING PLATFORMS

(76) Inventor: Paolo Castorino, viale Ippocrate 51, 00161 Rome (IT)

( * ) Notice: Subject to any disclaimer, the term of this patent is extended or adjusted under 35 U.S.C. 154(b) by 51 days.

(21) Appl. No.: 10/554,645

(22) PCT Filed: Sep. 19, 2003

(86) PCT No.: PCT/IT03/00561

§ 371 (c)(1),
(2), (4) Date: May 9, 2006

(87) PCT Pub. No.: WO2004/094185

PCT Pub. Date: Nov. 4, 2004

(65) Prior Publication Data

US 2007/0031225 A1 Feb. 8, 2007

(30) Foreign Application Priority Data

Apr. 24, 2003 (IT) .............................. RM03A0187

(51) Int. Cl.
*B60P 1/00* (2006.01)
*B65F 3/00* (2006.01)
*A47B 17/00* (2006.01)
*A47B 95/00* (2006.01)
*G02B 5/124* (2006.01)
*E04G 3/32* (2006.01)
*E04G 5/14* (2006.01)

(52) U.S. Cl. ...................... 414/545; 108/27; 248/345.1; 359/533; 182/112

(58) Field of Classification Search ................... 108/27; 280/851; 359/533, 515, 529, 548; 248/345.1, 248/633; 180/271; 52/3; 362/609, 623, 362/485, 495, 496, 499; 74/608
See application file for complete search history.

(56) References Cited

U.S. PATENT DOCUMENTS

| 3,137,087 | A | * | 6/1964 | Shroyer | 248/345.1 |
| 3,196,265 | A | * | 7/1965 | Schneider | 362/505 |
| 3,582,640 | A | * | 6/1971 | Ellard | 362/493 |
| 3,813,064 | A | * | 5/1974 | Heyworth | 244/114 R |
| 3,951,516 | A | * | 4/1976 | Rihm | 359/550 |
| 4,153,230 | A | * | 5/1979 | Giacin | 248/345.1 |
| 4,350,221 | A | * | 9/1982 | Ishima | 180/190 |

(Continued)

FOREIGN PATENT DOCUMENTS

DE 75 00 288 6/1975

(Continued)

*Primary Examiner*—Gregory W Adams
(74) *Attorney, Agent, or Firm*—Young & Thompson

(57) ABSTRACT

An anti-injury protection device for hydraulic lifting platforms of good-lifts, air platforms and similar includes tetrahedral structures (1) that may be applied for protection of the edges of sharp boards (P) of good-lifts, air platforms and similar, from which telescopic structures (6) are projecting for the protection of the edges, and of light devices (7) which get automatically started when they get into contact with the surface of the plane to be protected; in the lower part of the structures (1), horizontally pivoted planes (4, 5) are provided, kept in resting position by magnets or other and which, once opened, add their own fluorescence to the intermittent danger light signal placed on top of the tetrahedron so as to attract and contemporarily call the attention for showing the obstacle and the dangerous area.

7 Claims, 1 Drawing Sheet

U.S. PATENT DOCUMENTS

| | | | |
|---|---|---|---|
| 4,817,976 A * | 4/1989 | Kingsley | 280/154 |
| 5,807,043 A * | 9/1998 | Blank | 409/134 |
| 5,871,194 A * | 2/1999 | Morley | 248/345.1 |
| 6,243,958 B1 * | 6/2001 | Ringley, Jr. | 33/474 |
| 6,408,768 B1 * | 6/2002 | Giampavolo et al. | 108/27 |
| 6,446,397 B1 * | 9/2002 | O'Connor et al. | 52/64 |

FOREIGN PATENT DOCUMENTS

| | | |
|---|---|---|
| DE | 92 09 670 | 11/1983 |
| DE | 92 09 670 | 11/1993 |
| EP | 470947 A * | 2/1992 |
| EP | 0 479 652 | 4/1992 |
| EP | 1 010 575 | 6/2000 |
| FR | 2602191 A * | 2/1988 |
| WO | WO 85/01706 | 4/1985 |

\* cited by examiner

ANTI-INJURY PROTECTION DEVICE FOR HYDRAULIC LOADING PLATFORMS

The present invention concerns an anti-injury protection device for hydraulic boards of good-lifts, air platforms and similar and however for any similar working methodology on the ground, on the sea or on the air.

It is well known, e.g., that the manoeuvres of hydraulic boards of trucks and similar, loading and unloading goods sometimes also in second row in urban areas, often imply difficulties in manoeuvring and sometimes even risk of danger for motor-cyclist who may strike against the sharp edge of the board at the height of his head, with evident even bad injuries.

In fact, said board implies a danger due to its considerable and encumbering dimensions, its rigid metal body and its insidious rectangular shape, wide but thin, that all form a sharp, shearing element.

Similar danger situations are determined during the use of air platforms used for moves, for a vertical transport of loads from the ground to the floor and vice versa and in many other situations of move and/or railway and rubber loading and unloading, on the sea and on the air.

It is the aim of the present invention to eliminate the above mentioned risks by attracting the surrounding attention by light signals and fluorescent traffic signs, but most of all by coating with suitable anti-shock material opportunely chosen the most dangerous parts of hydraulic boards and other similar systems, in case of collisions, i.e. edges and sharp sides. According to the present invention, the protection of the edge will be obtained by means of a solid of a preferably tetrahedral shape, that may be applied to the edges of the board and provided with telescopic means that may be extracted for the protection of the sides, with an independent feeding of the light devices which starts automatically when it gets into contact with the surface of the plane to be protected. In the lower part of the tetrahedron horizontally pivoted planes are provided; said planes are kept in resting position by magnetic means or means of other kind which, when they get opened, add their own fluorescence to the intermittent danger signal placed on top of said tetrahedron, so as to attract and recall, at the same time, the attention onto the obstacle and the dangerous area. Said tetrahedron is provided to be realized with suitable material.

According to the present invention, said tetrahedron has inside a telescopic protection packing, that can be unthreated once the tetrahedron has been applied onto the edge, for increasing even more is protection function onto the blade that forma the edge f the board or of the air platform etc, coating it for anti-injury purposes.

The obvious advantages of the device according to the present invention are people safety, the easy application and, due to its small dimensions, the fact of not being encumbering during the working phases.

The present invention will be described more in detail herein below relating to the enclosed drawings in which an embodiment is shown.

FIG. 3 shows the device according to the present invention as applied to the hydraulic board or a truck and similar.

Figure 1:
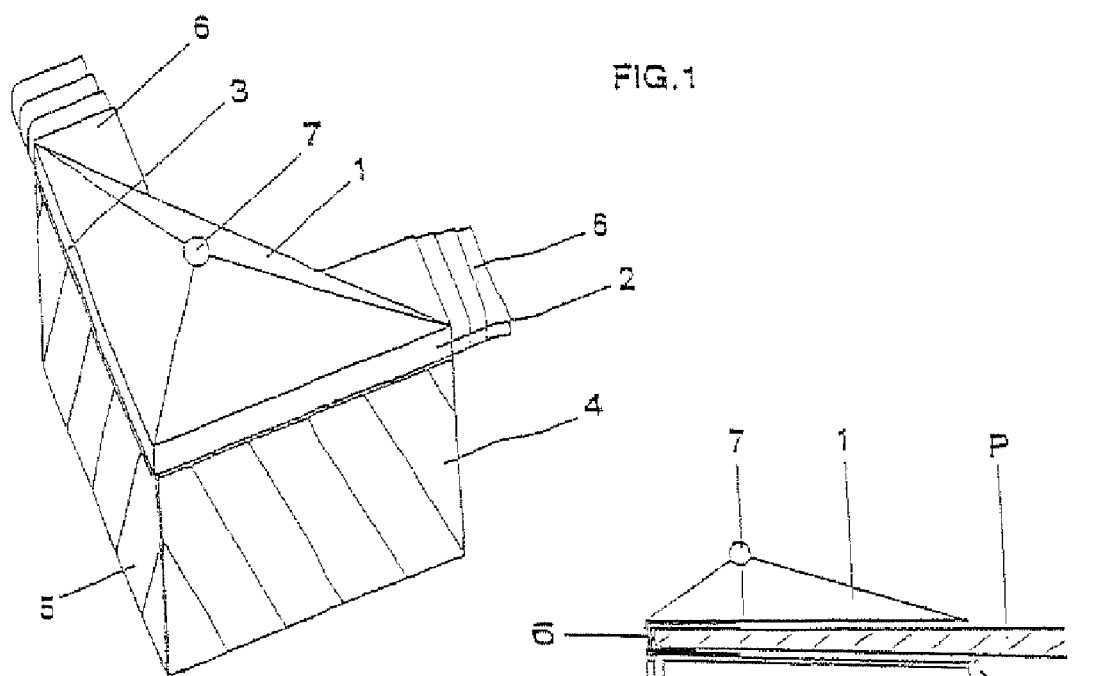
FIG. 1 shows an axonometric view of an anti-injury protection device for hydraulic boards of good-lifts, air platforms and similar, according to the present invention.
Figure 2:
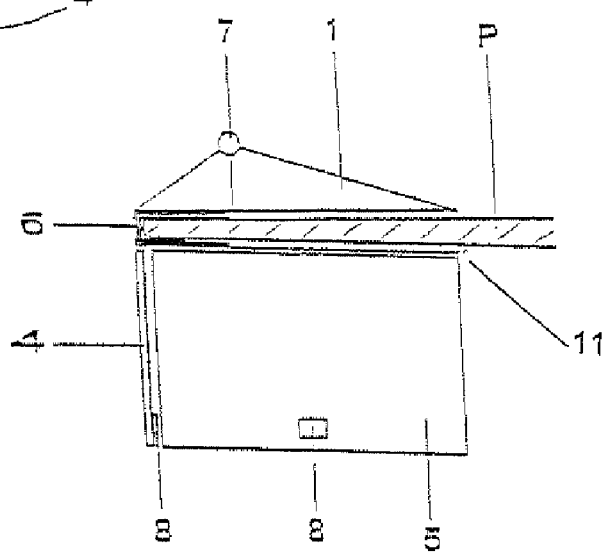
FIG. 2 shows a square section.
Figure 3:
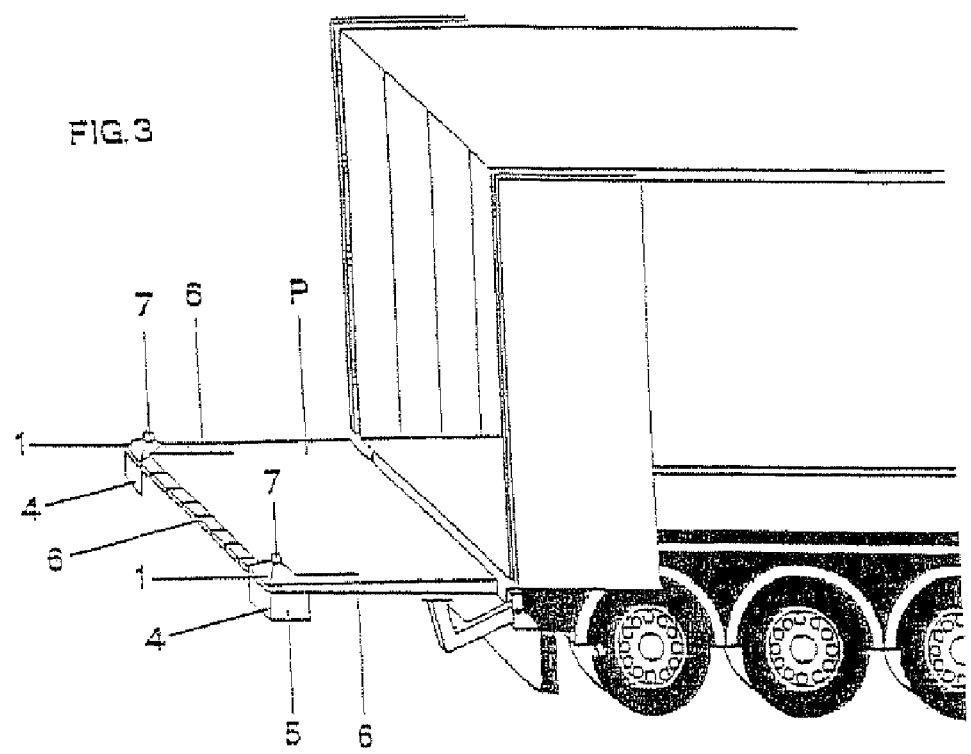

The enclosed figures show an anti-injury protection device for the hydraulic boards of good-lifts, of air platforms and similar, comprising:

a structure 1 with a mainly tetrahedral shape, applied to the edges and/or along a board P with telescopic perimetrical bands 2, 3 covering the sharp edges of said board B;

rectangular planes 4, 5, horizontally pivoted 11 in correspondence with said edges with respect to said structure 1, coated with fluorescent paint or similar so as to be fairly visible and making any collision against said boards P impossible;

a plurality of telescopic structures 6 covering, in their elongation, long portions of the sharp board P;

a lighting means 7, with automatic start when said board P is lowered and therefore means a danger for motor-cyclists, passersby and others;

a means S of metal adhesion for said planes 4-5, folded when not in use.

The working of the device according to the present invention is easy and obvious:

when said board P is lowered, element 7 of structures 1 is lighted and the horizontally pivoted planes 4-5 vertically lower down, so as to form a visualization of the danger;

the telescopic structures 6 may be elongated for a further and complete protection of the elongation of said board P.

The invention claimed is:

1. An anti-injury protection device, comprising:
a carrier-type vehicle having a hydraulic boards of goods lift attached to a rear of said vehicle, a hydraulic board (P) of goods lift having a raising and lowering arms;
structures (1) with a tetrahedral shape, applied to edges along said board (B) with telescopic perimetrical bands (2, 3) covering the edges of said board (P);
rectangular planes (4, 5), horizontally pivoted in correspondence with said edges and below said structures (1), coated with fluorescent paint so as to be fairly visible and warning against collision with said boards (P);
a plurality of telescopic structures (6) capable of extending along and covering long portions of said edges, wherein said telescopic structures (6) covering and extending from said structures (1) along the long portions;
a lighting means (7) that is started when said board (P) is lowered in the path of a motorcyclists, passers-by or others;
a means (8) for metal adhesion for affixing said planes (4-5) in a folded position, when said planes (4-5) are not in use.

2. A anti-injury warning and protection device comprising:
a carrier-type vehicle having a hydraulic board of goods lift attached to a rear of said vehicle, said hydraulic board of goods lift having raising and lowering arms;
a tetrahedral shaped structure placed on an upper plane of said board of said goods lift at an intersection of at least two edges of the board;
a lighting system attached to a top of the tetrahedral shaped structure, the lighting system is illuminated upon the board being placed in a path of a conveyance or person;
a telescoping cover, the telescoping cover extending from the tetrahedral shaped structure and covering an edge of the at least two edges of the board; and
a panel comprising:
 a pivotable attachment point attaching a first edge of the panel to a bottom portion of the at least two edges of the board; and
 an attachment device for attaching the panel to a bottom plane of the board,
 wherein the panel is coated with a high visibility paint.

3. The anti-injury warning and protection device of claim 2, wherein the panel further comprises a second edge, the second edge perpendicular the first edge, wherein the second edge extends down vertically from the intersection of the at least two edges of the board upon the board being positioned horizontally.

4. The anti-injury warning and protection device of claim 3, wherein there are two panels, each panel of the two panels on each of the edges of the at least two edges of the board.

5. The anti-injury warning and protection device of claim 2, wherein the attachment device is a magnet.

6. The anti-injury warning and protection device of claim 2, wherein the telescoping cover covers the long edge of the board.

7. The anti-injury warning and protection device of claim 2, wherein the high-visibility paint is fluorescent.

* * * * *